United States Patent [19]

Valassis et al.

[11] 3,986,170
[45] Oct. 12, 1976

[54] MODULAR CONTROL SYSTEM DESIGN WITH MICROPROCESSORS

[75] Inventors: John G. Valassis, Elmwood Park; James R. Holden, Chicago, both of Ill.; Madhukumar A. Mehta, Gujrat, India

[73] Assignee: GTE Automatic Electric Laboratories Incorporated, Northlake, Ill.

[22] Filed: May 30, 1974

[21] Appl. No.: 474,570

[52] U.S. Cl. ............................................ 340/172.5
[51] Int. Cl.[2] .......................................... G06F 9/18
[58] Field of Search ................................ 340/172.5

[56] References Cited
UNITED STATES PATENTS

| | | | |
|---|---|---|---|
| 3,029,414 | 4/1962 | Schrimpf | 340/172.5 |
| 3,573,741 | 4/1971 | Gavril | 340/172.5 |
| 3,651,484 | 3/1972 | Smeallie | 340/172.5 |
| 3,731,280 | 5/1973 | Shevlin | 340/172.5 |
| 3,740,725 | 6/1973 | Fletcher et al | 340/172.5 |
| 3,753,236 | 8/1973 | Flynn et al | 340/172.5 |
| 3,753,243 | 8/1973 | Ricketts, Jr. et al | 340/172.5 |
| 3,818,447 | 6/1974 | Craft | 340/147 LP |

Primary Examiner—Raulfe B. Zache

[57] ABSTRACT

An expandable modular control system with reduced memory requirements comprising an electronic data processing (EDP) system employing a microprocessor device and having gated program interrupt means. In particular, the expandable modular control system of the present invention comprises a "universal" microprocessor module which can be selectively combined with other separately packaged peripheral support modules to implement any particular control system required. Control point modules comprising a matrix array of flip-flops arranged as a plurality of n-bit words and subject to program control serve as extensions of the memory module to control the states of corresponding points in the system under the control of the modular control system. Sense point modules similarly organized in a matrix array monitor or sense the status of the points in the system under control and provide input data to the microprocessor module. Since the status of the C,Z,S and P flag bits cannot be restored the gated interrupt means also included selectively gate waiting program interrupts, if any, to the microprocessor coincident with a "gate interrupt" instruction in the program being executed so that a subroutine can be executed before the program is resumed thereby enabling the microprocessor to function as a virtually interruptable CPU.

12 Claims, 4 Drawing Figures

MODULAR CONTROL SYSTEM DESIGN WITH MICROPROCESSORS

BACKGROUND OF THE INVENTION

This invention relates to an expandable modular control system with reduced memory requirements employing a universal microprocessor module comprising a microprocessor device and having novel program interrupt means.

Reference may be made to the following U.S. Pat. Nos. 3,364,395; 3,716,843; 3,447,037; 3,105,869; 3,406,368; 3,560,799; and 3,576,515.

Prior to the introduction of "CPU-on-a-chip" LSI/MOS microprocessor devices employing primarily software (programming) rather than hardware (wired logic circuitry) in their data processing operation, electronic data processing (EDP) systems were, for the most part, specialized pieces of equipment utilizing hardware. Such systems were not therefore readily adaptable to a variety of different control system applications.

With the introduction of microprocessor devices, however, a new generation of versatile electronic data processing (EDP) systems which can be adapted to a wide variety of control system applications through substitution of new control programs has been developed. Although the resulting flexibility afforded the control system enables it to meet the requirements of a wide range of different control system applications, its use is limited somewhat by its memory capacity and the input/output devices with which it can interface, characteristics which for the most part are determined at manufacture. Thus, a particular microprocessor control system may have more than the optimum memory capacity for one application but too little for another. Similarly, the system may have the capability of interfacing with a particular type of input/output device required in one application, but which is an unneeded luxury in a different application. As a result, system design has heretofore been largely determined by a tradeoff between the desired versatility and the extra cost resulting from the additional memory and input/output capabilities required.

While the flexibility of many prior art control systems utilizing conventional CPU devices can be enhanced considerably by providing for the interruption of the control program to excute sub-routines as required, certain ones of the several microprocessor devices commercially available today are not able to restore the status of the carry (C), sign (S), zero (Z) and parity (P) flag bits after being interrupted. If the program is interrupted and the flag bit status is lost as a result thereof before a point is reached in the control program where the loss is immaterial, subsequent processing by the microprocessor will result in erroneous output data. Although subsequent generations of microprocessor devices have included means for restoring or otherwise retaining this information, the added cost of such devices is prohibitive for many simpler applications.

SUMMARY OF THE INVENTION

In accordance with the present invention, an expandable modular control system is provided for processing data responsive to a control program to thereby control a controlled system. In an embodiment of the invention, the expandable modular control system includes one or more memory modules for storing data and the control program and means comprising a microprocessor module having a microprocessor device for processing the data in accordance with the control program. One or more input/output (I/O) interface modules having corresponding input/output (I/O) devices associated therewith are also provided for inputting data to the microprocessor module and outputting processed data therefrom. Sense point and control point modules, each comprising an array of memory devices corresponding to a plurality of n-bits words having corresponding memory addresses associated therewith, respectively monitor the controlled system and apply control signals from the microprocessor module, control words from the microprocessor module being loaded into the control point module memory array to control the controlled system. Busing means including an extended input/output (I/O) address bus and a pair of extended input/output (I/O) data transfer buses intercouple the I/O interface modules and the microprocessor module for respectively addressing a particular I/O interface module and transferring data between the addressed I/O interface module and the microprocessor module. In addition, the busing means further includes an extended memory address bus and a pair of extended data transfer buses intercoupling the microprocessor module with the memory module and the sense point and control point modules for respectively addressing a particular memory address in the memory module and the sense point and control point modules and for transferring data between the memory address and the microprocessor module. Gated interrupt means are also provided for selectively interrupting the control program being run to permit the microprocessor module to temporarily leave the program to run a particular sub-routine then required. In particular, a "gate interrupt" instruction is included in the program at selected points therein to cause the gated interrupt means to check for a waiting interrupt and gate the microprocessor module if an interrupt is observed.

BRIEF DESCRIPTION OF THE DRAWINGS

The invention may be best understood, however, by reference now to the following description taken in conjunction with the accompanying drawings, in which like reference numerals identify like elements in the several figures and in which.

DETAILED DESCRIPTION

In accordance with the present invention, there is hereinafter shown and described an expandable modular control system with reduced memory requirements comprising an electronic data processing (EDP) system employing a microprocessor device and having novel program interrupt means.

In particular, the expandable modular control system of the present invention comprises a universal microprocessor module, e.g., a printed circuit card with one or more microprocessor devices mounted thereon, and separately packaged peripheral support modules or printed circuit cards, such as a memory module, sense point and control point modules, and input/output (I/O) interface modules. These and other peripheral support modules comprise a "library" of functional building blocks which can be selectively combined to implement virtually any modular control system or other electronic data processing system that may be required.

Moreover, the expandable modular control system of the present invention further includes a novel busing arrangement for interconnecting the microprocessor module with its peripheral support modules to selectively transfer data between the various modules in accordance with the program controlling the data processing operations of the system.

Figures 1, 1A:
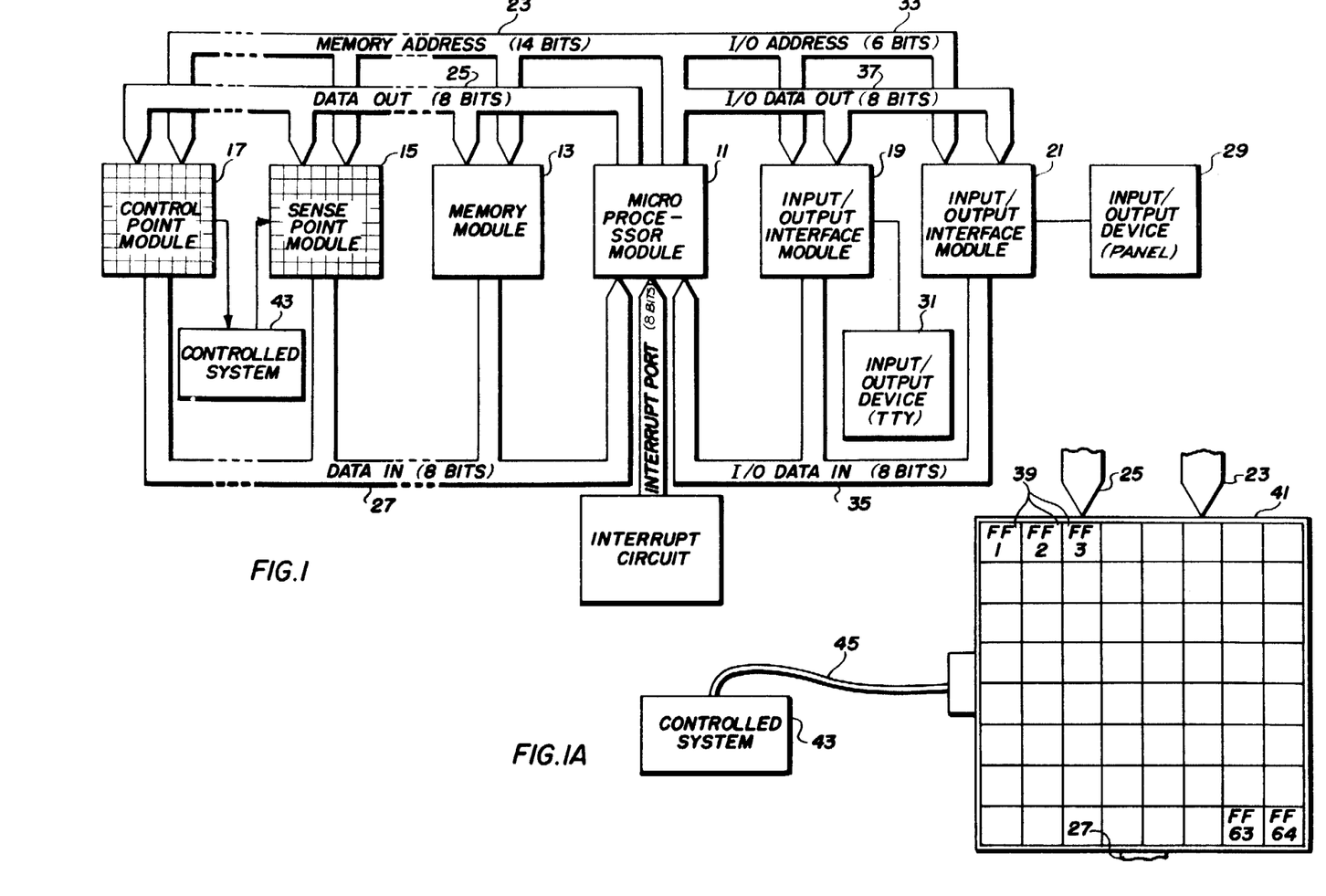
FIG. 1 is a block diagram of an expandable modular control system in accordance with the present invention employing a universal microprocessor module having means for gating interrupts thereto.
FIG. 1A illustrates in greater detail the sense point module of the expandable modular control system shown in FIG. 1.

Referring now to FIG. 1, the modular control system illustrated therein comprises a microprocessor module 11 interconnected with a memory module 13, sense point and control point modules, 15 and 17, respectively, and a pair of input/output (I/O) interface modules, 19 and 21. It should be understood, however, that the particular embodiment shown in FIG. 1 is only by way of example and should not be construed to be the only embodiment. In fact, many different control systems can be effected by selectively combining the various modules required for a particular application by means of a busing arrangement.

As shown in FIG. 1, the busing arrangement includes a Memory Address bus 23 intercoupling the microprocessor module 11 with the memory module 13 to permit the microprocessor module 11 to address a particular memory location in the memory module 13 by means of a 14-bit memory address. Data is then selectively transferred between the microprocessor module 11 and the memory module 13 via a pair of data transfer buses. In particular, 8-bit data words are transferred over a Data Out bus 25 to the locations in the memory module 13 specified by the memory address while data withdrawn from a specified address in the memory module 13 is transferred to the microprocessor module 11 over an 8-bit Data In bus 27.

Peripheral input/output (I/O) devices such as, for example, a display panel 29, a teletypewriter (TTY) 31 and the like provide means for inputing data to the microprocessor module 11 and receiving processed data or information therefrom. Again, it should be understood that a wide variety of input/output (I/O) devices are available, each having unique interfacing requirements which must be satisfied if the I/O device is to be operationally compatible with the modular control system of the present invention. Accordingly, corresponding input/output (I/O) interface modules are provided to interface the I/O devices with the control system. Specifically, in the present embodiment, I/O interface module 19 couples the teletypewriter 31 to the remainder of the control system while I/O interface module 21 interfaces the display panel 29. These I/O interface modules function to synchronize the differing operating speeds of their respective associated I/O devices to the microprocessing module 11. Further, the I/O interface modules translate the input data coupled thereto from the corresponding I/O device to a machine-language binary code compatible for processing by the microprocessor module 11.

A 6-bit Input/Output (I/O) Address bus 33, coupling the microprocessor module 11 to the I/O interface modules, 19 and 21, provides a means for addressing a particular I/O device with a corresponding 6-bit address transmitted thereto via the I/O Address bus 33. The 6-bit I/O address permits the addressing of up to 24 I/O devices in the output mode whereby processed data and information is output to the particular I/O device addressed and up to 8 I/O devices in the input mode whereby raw data is obtained from the particular I/O device addressed.

When the I/O address is transmitted, the information to be input or output, as the case may be, is then transferred between the microprocessor module 11 and the addressed I/O device via a data bus and the particular I/O interface module corresponding to the I/O device addressed. More particularly, the input data from a particular I/O device is converted into a sequential plurality of 8-bit words by the corresponding I/O interface circuit and coupled via an Input/Output (I/O) Data In bus 35 to the microprocessor module 11. In like manner, processed data or other information can be transferred from the microprocessor module 11 to a particular I/O device over an 8bit Input/Output (I/O) Data Out bus 37 coupled to the corresponding I/O interface module.

In accordance with one aspect of the present invention, a sense point module 15 and a control point module 17 are included to respectively monitor certain selected parameters of the system being supervised by the control system and to apply control signals to the controlled system in response thereto under the direction of the control system. In addition, the sense point and control point modules, 15 and 17, respectively, function as extensions of the memory module 13 thereby reducing the storage capacity required of the memory module 13 and the cost associated therewith.

This and other advantages may be more clearly understood by reference now to FIG. 1A wherein the sense point module 15 is shown in greater detail. There it may be seen that the sense point module 15 comprises a plurality of flip-flops 39 arranged in a matrix array on a printed circuit card 41. In the present embodiment, for example, 64 flip-flops 39 are arranged in an 8-by-8 matrix. Since the flip-flops 39 are bistable devices which can be set and reset between two stable states, the 8-by-8 array is functionally similar to the array of memory elements comprising the memory module 13. Accordingly, the sense flip-flop matrix serves as a separate 8-word-by-8-bit extension of the external memory module 13, each 8-bit word in the sense point module 15 corresponding to a particular 14-bit memory address.

The flip-flops 39 comprising the sense point module 15 are also coupled to the system being controlled by the modular control system, i.e., controlled system 43, to monitor certain assigned parameters therein. For example, in a telephone communications system, the sense point module 15 may be used to monitor the "on/off hook" status of a plurality of telephones coupled to the system. Access to the relays and other electromechanical equipment comprising the telephone system may be obtained through a cable connector arrangement 45 coupled to the sense point module card 41. Appropriate connections (not shown) may then be made between the connector arrangement 45 and the flip-flops 39 so that the data coupled to the sense point module 15 can be stored, i.e., registered, in the flip-flop matrix as a plurality of 8-bit words, each having a particular 14-bit memory address associated therewith.

Similarly, the control point module 17 also comprises a matrix array of flip-flops arranged to correspond to a plurality of 8-bit words. While the word capacity of the control point module 17 may differ from that of the sense point module 15, depending upon the requirements of the controlled system 43, the control point module 17 is substantially identical to the sense point module 15 in every other respect. The only other limitations placed on modules 15 and 17 are that the word length (8-bits in the present embodiment) must be compatible for processing by the microprocessor device, and each word must have a unique memory address associated therewith.

In FIG. 1, it may be seen that the Memory Address bus 23 to memory module 13 is extended to also couple the sense point module 15 and the control point module 17 to the microprocessor module 11. Accordingly, the microprocessor module 11, responsive to the control program, selectively addresses the sense point module 15 by coupling the 14-bit memory address corresponding to the particular word location wherein the monitored data is stored to the sense point module 15 via the Memory Address bus 23. The data "read" from the sense point module 15 is then transmitted to the microprocessor module 11 via an extension of the Data In bus 27 where it is processed by the microprocessor module 11 in accordance with the control program.

After processing the retrieved data, the microprocessor module 11 may issue control decisions or commands to the control point module 17 in the form of one or more 8-bit "control" words. The particular word location in the control point module 17 where the control word is stored is determined by a 14-bit memory address coupled to the control point module 17 via the extended Memory Address bus 23. The control word is then transferred to control point module 17 by means of an extension of the 8-bit Data Out bus 25 from the microprocessor module 11 and loaded into the corresponding word location, i.e., flip-flops 39. Accordingly, the control point module 17 is then effective to control the controlled system 45 responsive to the control words issued by the microprocessor module 11 in response to the monitored data.

Although the sense point and control point modules, 15 and 17, respectively, have been described as comprising an 8-word-by-8-bit flip-flop matrix array, it will be apparent to one skilled in the art that such an arrangement is for illustrative purposes only and that other similar arrangements are equally well suited for this purpose. It should be further understood that the expandable modular control system of the present invention is not necessarily limited to use with telephone communication systems, but can be adapted to any system wherein certain system parameters are to be monitored to control the system in accordance with a control program.

As previously noted, electronic data processing (EDP) systems such as the expandable modular control system of the present invention are frequently subject to "interrupts" whereby the control program being executed by the microprocessor module 11 is interrupted to run a higher priority sub-routine or to run certain sub-routines which must be periodically executed. Often these sub-routines connot wait until the entire program has been completely exceuted. Since with certain microprocessor devices the status of the C, Z, S, and P flag bits cannot be restored if the program is interrupted, it is advisable to interrupt the program at a point where that information is no longer required for subsequent processing operations.

Accordingly, novel gated interrupt means are provided to interrupt the control program, causing the microprocessor to temporarily leave the program to run a particular sub-routine then required. In particular, a "gate interrupt" instruction is included in the control program at selected points therein to cause a grated interrupt circuit 47 to check for waiting interrupt signals and gate them to the microprocessor module 11 if an interrupt is waiting to be processed. The resultant gated interrupt signals generated by the gated interrupt means 47 are applied to microprocessor module 11 via an 8-bit interrupt port 49 to enable the microprocessor module 11 to receive the "interrupt". If no interrupt is requested, however, the system will proceed to the next instruction in the program. All interrupts occurring after that time will wait until another "gate interrupt" instruction is executed.

Figure 2:
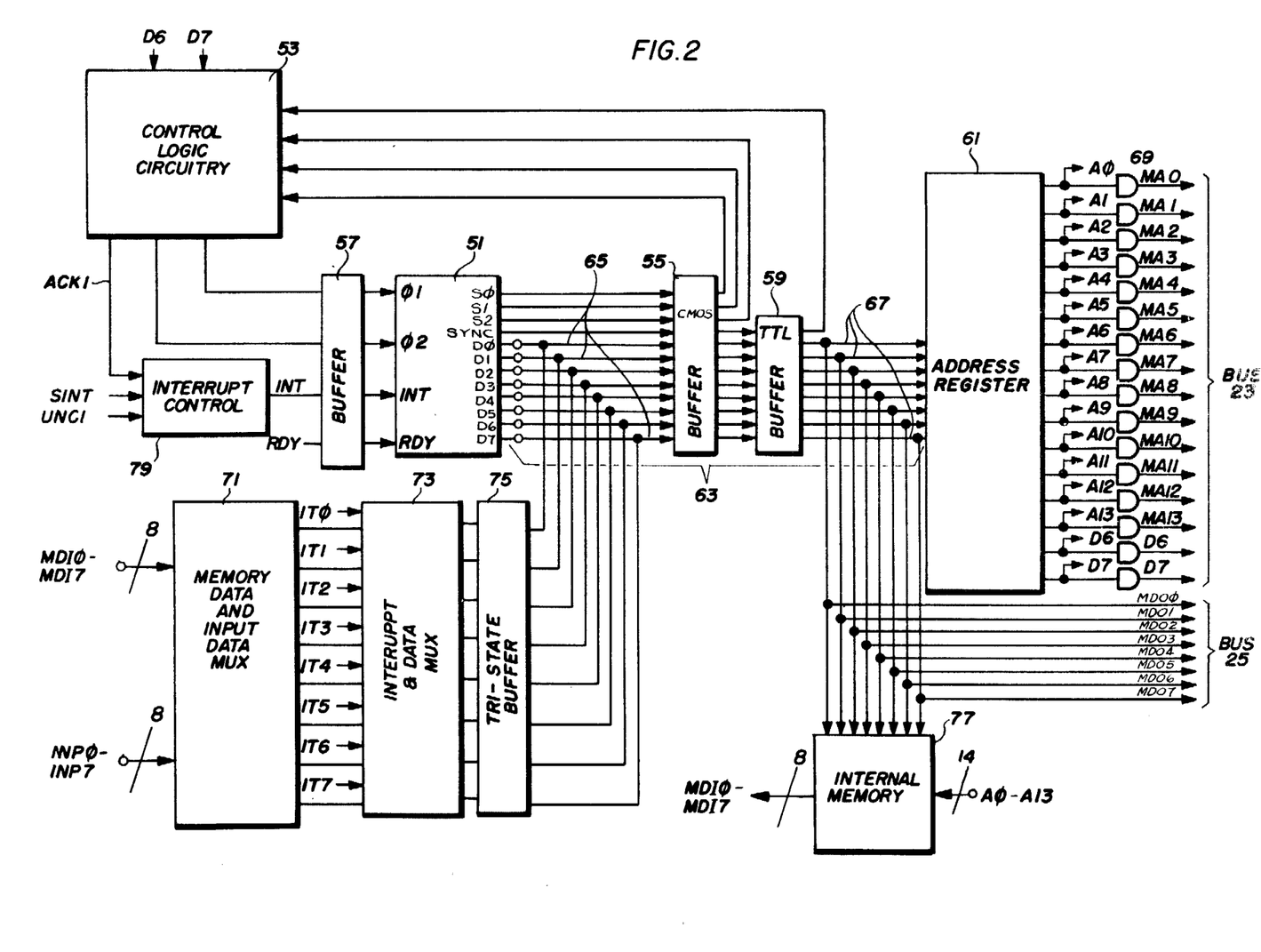
FIG. 2 is a combined schematic and block diagram illustrating a universal microprocessor module for implementing the expandable modular control system shown in FIG. 1.

With reference now to FIG. 2, there is shown a "universal" microprocessor module 11 for implementing an expanded modular control system with gated interrupt means in accordance with the present invention. Although the microprocessor module 11 hereinafter shown and described can be readily implemented with any of a number of commercially available microprocessor device, in a working embodiment of the present invention, the Intel 8008-1 microprocessor device was utilized to illustrate the practical realization of the modular control system of the present invention. It should be understood, however, that with only minor modifications, which will be apparent to one skilled in the art, other microprocessor devices may be equally well suited for incorporation in the microprocessor module 11.

In particular, the microprocessor module 11 comprises a microprocessor device 51 having: (1) a program register which is incremented after each succeeding instruction in the control program has been executed to corresponding to the memory address of the next instruction to be executed in the control program sequence; (2) an instruction register which is sequentially loaded with the instructions comprising the control program responsive to the program register being successively incremented to contain the corresponding memory addresses thereof; (3) an arithemetic-logic unit for processing data in accordance with the control program and including C, Z, S and P flip-flops for indicating the status of the flag bits; and (4) a local memory comprising seven 8-bit registers including an accumulator for registering the data being operated upon in accordance with the instruction then contained in the instruction register, H and L registers which respectively contain the high- and low- order bits of an respectively contain the high- and low- order bits of an indirect memory address corresponding to data to be processed in accordance with the instruction, and four other registers for temporary storage of data while it is being processed.

Operationally, the microprocessor device 51 functions in response to control signals generated by control logic circuitry 53 associated therewith. At any particular time in the control program sequence, the operational status of the microprocessor device 51 is reflected by a 3-bit output status signal (S$\phi$, S1, S2) generated at corresponding outputs thereof to indicate the progress of the microprocessor device 51 in processing a particular instruction, i.e., whether the instruction is being fetched from the memory of is being executed or the like. The status signal (S$\phi$, S1, S2), in turn, is coupled through a CMOS buffer stage 55 to corresponding inputs of the control logic circuitry 53 which in response thereto generates the various internal and external control signals required for setting the proper operating conditions in the various devices comprising the microprocessor module 11 in particular and the modular control system generally.

The control logic circuitry 53 also includes clock means (not shown) for generating a pair of clock signals, $\phi$1 and $\phi$2, which are, in turn, coupled through a TTL buffer 57 to corresponding inputs of the microprocessor device 51. The $\phi$1 and $\phi$2 clock signals control the timing of the microprocessor operations to synchronize the microprocessor device 51 with those operations being carried on by the other devices comprising the control system. Accordingly, a sync signal is also coupled from a corresponding output of microprocessor device 51 to the control logic circuitry 53 through the CMOS buffer 55 and a TTL buffer 59 to synchronize the control logic clock means with the microprocessor device 51 for synchronous operation of the control system in accordance with the control program.

The instructions comprising the control program are ordinarily executed in sequence as they occur in the program. Thus, in the present embodiment, the program register is incremented after each instruction in the program has been executed to correspond to the particular memory address of the next instruction in the program.

Thus, the memory address corresponding to the memory location of the next instruction in the control program is coupled from the input/output ports, D$\phi$–D7, of the microprocessor device 51 to the corresponding inputs of an address register 61 as a pair of 8-bit words by means of an internal address/data transfer bus, identified generally at 63. In particular, the internal address/data bus 63 comprise a bidirectional data bus 65 coupling the D$\phi$–D7 input/output ports of the microprocessor device 51 to the corresponding inputs of the CMOS buffer 55 which has the TTL buffer 59 coupled in tandem therewith. The CMOS and TTL buffers, 55 and 59, respectively, convert the signal level of the memory address output from the microprocessor device 51 to a level compatible for registry in the address register 61. The buffered memory address is then coupled from the TTL buffer 59 to corresponding inputs of the address register 61 via a buffered data bus 67. Accordingly, the two 8-bit words comprising the memory address of the next instruction to be executed are sequentially loaded into the address register 61 which in the present embodiment, for example, comprises four 4-bit bistable latches (e.g., Texas Instruments No. 7475).

In the present embodiment, the memory module 13 and the sense control point modules, 15 and 17, respectively, have a combined storage capacity of slightly more than 16,000 words, each 8-bit word corresponding to a unique 14-bit memory address. Thus, the 14-bit memory address of the instruction is loaded into the address register 61 to specify the memory location of the next instruction to be loaded into the instruction register in the microprocessor device 51. Since only fourteen bits are required to specify the memory address, the two remaining bits (D6 and D7) loaded into the address register 61 are utilized to indicate that the microprocessor module 11 is operative in the "instruction fetch" mode. The D6 and D7 outputs of address register 61 are, in turn, coupled through a buffer 69 to the control logic circuitry 53 as inputs thereto. At other times, the D6 and D7 outpus are indicative that the microprocessor module 11 is operative in one of the "memory read", "memory write", or "input/output" modes.

The memory address stored in address register 61 is, in turn, output through buffer 69 at MA$\phi$–MA13 and coupled to the memory module 13 via the expanded Memory Address bus 23 (FIG. 1) to address the corresponding memory location. The instruction stored at the addressed memory location is then coupled over the Data In bus 27 (FIG. 1) from the memory module 13 to the memory data input ports, MDI$\phi$–MDI7, of a memory data and input data multiplexor 71 (e.g., dual Texas Instruments No. 74155 two-to-four line decoder/multiplexors).

In turn, the instruction from the memory module 13 is coupled through the memory data and input data multiplexor 71 to the corresponding input terminals of an interrupt and data multiplexor 73 comprising quadrupled two-line-to-one-line data selector/multiplexor devices (e.g., Texas Instruments No. 74157). Therafter, the pai of 8-bit words comprising the instruction are sequentially coupled from the interrupt and data multiplexor 73 to the input/output ports, D$\phi$–D7, of microprocessor device 51 through a quadrupled bus buffer gate 75 with tri-state output (e.g., Texas Instruments No. 74125) coupled to the bidirectional data bus 65 and loaded into the instruction register of microprocessor device 51.

Each instruction loaded into the microprocessor instruction register comprises an operation code (op code) for determining what operation the microprocessor device 51 is to perform and an operand code designating the address of the data which is to be operated upon in accordance with the op code. The operand code, in turn, is coupled from the instruction register and loaded into the H and L registers of the microprocessor device 51 to correspond to the address of the data to be processed. The address is then coupled from the input/output (D$\phi$–D7) ports of the microprocessor device 51 and loaded into the address register 61 via the internal address/data transfer bus 63.

If the D6 and D7 bits indicate that the data is to be "read" from memory, the address is coupled from the buffered outputs, MA$\phi$–MA13, of address register 61 to the memory module 13 and the sense point and control point modules, 15 and 17, respectively, over the expanded Memory Address bus 23. The data stored at the location corresponding to the address is then coupled to the memory data input ports (MDI$\phi$–MDI7) of the multiplexor 71 via the expanded Data In bus 27 and coupled therethrough to the interrupt and data multiplexor 73 and ultimately to the input/output ports (D$\phi$–D7) of the microprocessor device 51 where it is loaded into the accumulator register therein.

Alternatively, if the d6 and D7 bits indicate that the microprocessor module 11 is operative in the "input/output"mode, the instruction operand code comprises a 6-bit input/output address for addressing the corresponding input/output device so that input data can be received therefrom. In particular, the 6-bit I/O address is coupled from the input/output port (D$\phi$–D7) of the microprocessor device 51 to the address register 61. In turn, the I/O address is output from register 61 at corresponding unbuffed outputs, A8-A13, and coupled to the input/output interface module corresponding to the addressed input/output device by means of the I/O Address bus 33. The data from the addressed I/O device is then coupled to the input data ports, INP$\phi$-INP7, of the memory data and input data multiplexor 71 via the I/O Data In bus 35 and loaded into the accumulator register of the microprocessor device 51.

After the arithemetic-logic unit of the microprocessor device 51 has processed the data in accordance with the instruction op code, the processed data may be output to an input/output device, written into a "permanent" storage location, or temporarily stored in the microprocessor module 11 for subsequent processing after additional data has been processed.

If the processed data is to be "permanently" stored in the external memory module 13 or issued to either of the sense point or control point modules, 15 and 17, respectively, as a control word, subject of course to retrieval therefrom, the operand of the corresponding "store" instruction specifies the address at which the information is to be stored. Accordingly, once again the memory address is coupled to the address register 61 by means of the internal address/data transfer bus 63 and, in turn, coupled from the buffered MA$\phi$-MA13 outputs of register 61 to the memory module 13, the sense point module 15 and the control point module 17 via the expanded Memory Address bus 23. The processed data or control word is coupled to the MDO$\phi$-MD07 output terminals of the microprocessor module 11 via the internal address/data transfer 63 and an extension 67a of the buffered data bus 67. The processed data is then coupled over the expanded Data Out bus 25 coupled to the MDO$\phi$-MD07 terminals to the designated memory location in the memory module 13 or the sense point or control point modules, 15 and 17, respectively, for storage therein.

If, on the other hand, the processed data is to be output to an input/output device, the corresponding instruction operand comprises a 6-bit I/O address which is transferred to the address register 61 via the internal address/data transfer bus 63 and coupled to the corresponding input/output interface module over the I/O Address bus 33. The processed data is transferred via the internal address/data transfer but 63 from the D$\phi$-D7 input/output ports of the microprocessor device 51 to the address register 61. The processed data is then coupled from the unbuffered A$\phi$-A7 outputs of registger 61 to the interface module corresponding to the addressed I/O device by means of the I/O Data Out bus 37. The processed data is then available to the I/O device for outputing to the operator as paper tape, a panel display, or the like.

Temporary storage of the processed data is facilitated by providing an optional internal memory 77 which, in the present embodiment, for example, comprises a 1K × 8-bit word random-access (RAM) memory and a 2K ×8-bit word ready-only (ROM) memory. In particular, the ROM memory provides sufficient memory capacity for storing sub-routines for small data-formatting type applications to provide a flexibility not afforded by the control program stored in the memory module 13. The RAM memory, on the other hand, serves as a "scratch pad" for temporarily storing processed data prior to further processing.

The internal memory 77 is addressed by a memory address coupled thereto from the microprocessor device 51 via the address register 61 when the microprocessor module 11 is operative in the "memory write" mode. As may be seen in FIG. 2, the address is coupled from the unbuffered outputs (A$\phi$-A13) of address register 61 directly to corresponding inputs of the internal memory 77 to specify a particular memory address or location therein while the data is coupled to the designated memory location in the RAM portion of the memory 77 via the extension 67a of the internal address/data transfer bus 63. When the instructions comprising a sub-routine or temporarily stored data is to be "read" from the internal memory 77 by the microprocessor device 51, the memory 77 is similarly addressed through the address register 61 (i.e., unbuffered outputs A$\phi$-A13). The instruction or data is then coupled from the memory 77 to the memory data inputs (MDI$\phi$-MDI18) of the memory data and input data multiplexor 71 for processing by the microprocessor device 51.

As previously mentioned in connection with FIG. 1, gated interrupt means are also provided for selectively gating the microprocessor module 11 at selected points in the control program, thereby permitting a sub-routine corresponding to a waiting interrupt to be run before proceeding with the control program.

As shown in FIG. 2, the gated interrupt means comprises an interrupt control circuit 79 having an output coupled through TTL buffer 57 to a corresponding input (INT) of the microprocessor device 51. The interrupt control circuit 79 is selectively gated by an Acknowledge Interrupt (ACKI) signal from the cotnrol logic circuitry 53 to allow a waiting system interrupt (SINT) signal to be applied to the microprocessor device 51.

In particular, when a system interrupt (SINT) signal is applied to the interrupt control 79, it is held in abeyance until the enabling ACKI signal is subsequently applied to the interrupt control 79. At that time, a pair of externally-generated 8-bit words identifying the particular sub-routine to be run in response to the interrupt is applied to the input data ports (IT$\phi$-IT7 of the interrupt and data multiplexor 73. Accordingly, when the microprocessor device 51 is gated by the interrupt control circuit 79, the 8-bit words applied to the interrupt and data multiplexor 73 are coupled to the input-/output ports (D$\phi$-D7) of the microprocessor device 51 and entered into the program register thereof. Accordingly, the address then contained in the program register corresponds to the memory address of the first instruction in the new sub-routine, causing the microprocessor device 51 to deviate from the control program. The program register will then be successively incremented to run through the sub-routine until the final instruction thereof directs it to return to its original place in the control program.

Since the status of the C, Z, S and P flag bits stored in the corresponding flip-flops is lost anyway when electrical power is initially applied to the modular control system or, alternatively, when the power thereto is shut off, it is not necessary to gate the microprocessor device 51 for this class of interrupts. Accordingly, for such situations, an unconditional interrupt (UNCI) signal can be applied to the interrupt control circuit 79 o immediately interrrupt the microprocessor device 1 without waiting for the ACKI gating signal.

Figure 3:
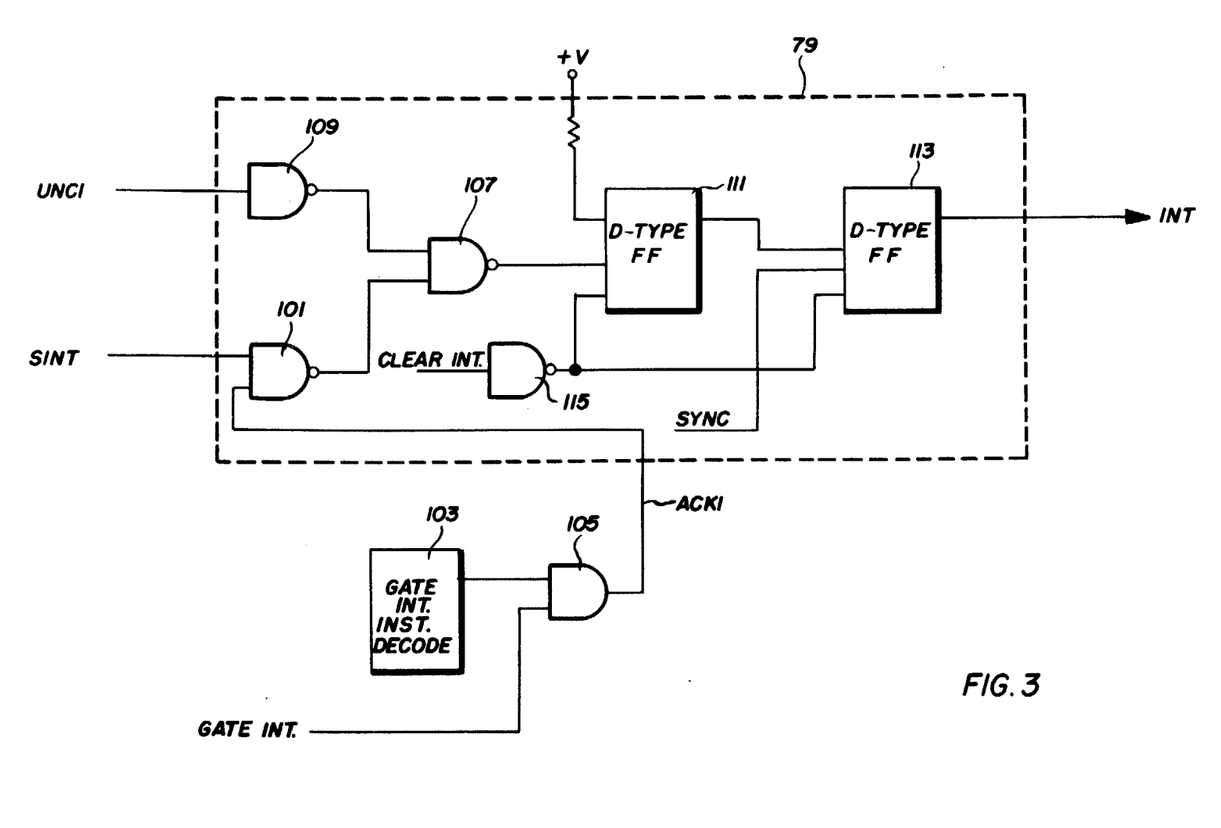
FIG. 3 is a schematic diagram illustrating the novel gated interrupt means shown in FIGS. 1 and 2.

While the gates interrupt means has been generally described in connection with FIGS. 1 and 2, the structure and operation of the interrupt control circuit 79 provided in accordance with the present invention may be better understood by reference now to FIG. 3. More particularly, the system interrupt (SINT) signal is generated externally to the modular control system by an perator and coupled to one input of a NAND gate 101 (e.g., Texas Instruments No. 7400) while the acknowledge interrupt (ACKI) signal generated by the control gic circuitry 53 (FIG. 2) is coupled to the other input hereof.

In the present embodiment, the control logic circuitry 53 also includes a gate interrupt instruction decoder 103 which monitors the instruction register of the microprocessor device 51 for "gate interrupt" instructions selectively incorporated into the control program by the programmer. When a "gate interrupt" instruction is monitored, the decoder 103 enables an AND gate 105 (e.g., Texas Instruments No. 7408) coupled to the output thereof to generate the acknowledge interrupt (ACKI) signal simultaneously with a synchronizing or strobe pulse (GATE INT) applied to the other input of AND 105. The resultant ACKI signal generated at the output of AND 105 periodically gates NAND 101 so that a waiting system interrupt (SINT) applied to the other input of NAND 101 enables NAND 101.

NAND gate 107, in turn, is disabled by the resulting low-level (L) signal applied to one its inputs by NAND 101 when NAND 101 is enabled and accordingly generates a high-level (H) output signal during intervals corresponding to the gated interrupts. The other input of NAND gate 107 is coupled to the output of an inverter 109 (e.g., Texas Instruments No. 7404) having the unconditional interrupt (UNCI) signal applied to its input. Consequently, whenever an unconditional interrupt signal is generated, the inverter 109 applies a low-level (L) signal to the other input of NAND 107 to disable it and thereby generate a high-level (H) output signal therefrom. Thus, it will be apparent that in the absence of unconditional interrupts and gated interrupts, the output signal from NAND 107 will be low-level (L).

Responsive to a gated interrupt or an unconditional interrupt, however, the resultant high-level (H) output from NAND 107 "sets" a D-Type flip-flop 111. In turn, flip-flop 111 is effective to set a second D-Type flip-flop 113 coupled to its output coincident with a sync pulse from the microprocessor module 11 being coupled to the other input thereof. Consequently flip-flop 113 will be set by an unconditional interrupt or a gated interrupt signal in synchronization with the sync signals generated by the microprocessor module 11.

When flip-flop 113 is set, an interrupt (INT) is coupled from the output of flip-flop 113 to the corresponding input of the microprocessor device 51 to permit a waiting interrupt, or an unconditional interrupt, as the case may be, to be gated to the microprocessor device 51 as heretofore described.

Subsequently the flip-flops, 111 and 113, are reset responsive to a CLEAR INT signal being applied to the input of inverter 115 and coupled therethrough to the reset gates of flip-flops 111 and 113.

Accordingly, there has been shown and described a modular control system implemented by means of a microprocessor module and separate supporting peripheral functional modules and accordance with the present invention to provide an expandable modular control system. In particular, there has been shown means for extending the memory capacity of the system by providing sense and control point networks, which by execution of regular instructions, can be easily accessed thereby minimizing control programs. Further, gated interrupt control means have been provided to provide a truly interruptable mode of operation.

Based on the implementation of the microprocessor module or card with commercially available microprocessor devices, such as the Intel 8008-1, several features have been disclosed which expand both the I/O capabilities of the system and provide the virtual interrupt feature in the device. Such features are not inherently available in present generation commercially available microprocessor devices. The introduction of the modular concept to the control point and sense point matrices required for the interconnection of the disclosed control system and the system to be controlled provides for complete flexibility in tailoring any control system required by facilitating the addition or substitution of physically identical modules, thereby obviating the need for designing new units for the different control applications and, hence, reducing system development costs appreciably.

While a particular embodiment of the present invention has been shown and described, it will be obvious to those skilled in the art that various changes and modifications can be made without departing from the invention in its broader aspects. Accordingly, the aim in the appended claims is to cover all such changes and modifications as may fall within the true spirit and scope of the invention.

We claim:

1. An expandable modular control system for controlling a second system in response to data gathered from said second system and processed in accordance with instructions arranged as a control program, comprising:

modular memory means for storing said gathered data and said instructions at particular memory addresses therein;

modular microprocessor means for processing said gathered data in accordance with said control program and for generating control data for controlling said second system;

memory bus means intercoupling said modular memory means and said modular microprocessor means including a memory address bus and a data transfer bus;

means connected to said memory bus means for gathering data from said second system including a sense point module comprising a first array of memory devices for storing said gathered data and arranged as memory words each having a first unique memory address associated therewith, said sense point module being connected to said data transfer bus for transmitting said gathered data to the modular microprocessor means for processing in response to the modular microprocessor means transmitting said first unique memory addresses on said memory address bus;

means connected to said memory bus means for controlling said second system including a control point module comprising a second array of memory devices arranged as memory words each having a second unique memory address associated therewith, said control point module being connected to said data transfer bus for receiving and storing control data transmitted by the modular microprocessor means in response to said modular microprocessor means transmitting said second unique memory addresses on said memory address bus;

gated interrupt means for receiving and storing interrupts and for selectively gating to said modular microprocessor means an interrupt memory address corresponding to a beginning address of a subroutine stored in said modular memory means in response to said modular microprocessor means receiving a gate interrupt instruction after said gated interrupt means receives at least one of said interrupts.

2. An expandable modular control system in accordance with claim 1 wherein said modular microprocessor means includes a microprocessor device and input means coupled thereto for inputing said gathered data and said instructions to said microprocessor device; and wherein said gated interrupt means includes interrupt and data multiplexer means interposed between said input means and said microprocessor device for inputing said interrupt memory address to said microprocessor device, and interrupt control means for applying an interrupt control signal to said microprocessor device to selectively gate said interrupt memory address to said microprocessor device in response to said modular microprocessor means receiving said gate interrupt control instruction.

3. An expandable modular control system in accordance with claim 2 wherein said modular microprocessor means generates an acknowledge interrupt (ACKI) signal concurrent with said gate interrupt control instruction being processed by said modular microprocessor means and said control system including means for generating a system interrupt (SINT) signal whenever one of said interrupts is waiting to be processed by said modular microprocessor means and means for generating an unconditional interrupt (UNCI) signal whenever one of said interrupts is to be processed immediately without waiting for said ACKI signal to be generated, said interrupt control means including first gate means for generating a first enabling signal in response to the concurrent occurrence of said ACKI and SINT signals and second gate means for generating a second enabling signal for causing an interrupt control output signal to be applied to said microprocessor device to gate said interrupt memory address thereto in response to the occurrence of said first enabling signal or the occurrence of said UNCI signal.

4. An expandable modular control system in accordance with claim 3 including means for generating a system synchronization signal to synchronize the operation of said control system and wherein said interrupt control means includes means comprising first and second flip-flops for synchronizing said interrupt control output signal with said system synchronization signal, said first and second flip-flops being coupled between the output of said second gate means and said interrupt control means said first flip-flop assuming a set state in response to said second enabling signal, said second flip-flop generating said interrupt control output signal in response to the concurrent occurrence of said system synchronization signal and said first flip-flop being in said set state.

5. An expandable modular control system in accordance with claim 1 wherein said data transfer bus means includes a data out bus intercoupling said modular microprocessor means with said modular memory means and said control point module to selectively transfer said processed data and said control data from said modular microprocessor means to said modular memory means and control point modules and wherein said data transfer bus means also includes a data in bus intercoupling said modular microprocessor means with said modular memory means and said sense point module to selectively transfer said gathered data, control data and said instructions from said modular memory means and said sense point module to said modular microprocessor means.

6. An expandable modular control system in accordance with claim 1 wherein said modular microprocessor means includes a printed circuit card for mounting said modular microprocessor means.

7. An expandable modular control system in accordance with claim 1 including input/output means comprising one or more input/output interface modules having corresponding input/output devices associated therewith for inputing data to said modular microprocessor means and for outputing processed data therefrom and further including extended input/output address but means and extended input/output data transfer bus means intercoupling said input/output interface modules and said modular microprocessor means for respectively addressing a particular one of said input/output interface modules and transferring data between said addressed input/output interface module and said modular microprocessor means.

8. An expandable modular control system in accordance with claim 7 wherein said extended input/output data transfer bus means includes an extended input/output data out bus intercoupling said modular microprocessor means with said input/output interface modules to transfer processed data from said modular microprocessor means to said input/output interface modules and wherein said extended input/output data transfer bus means also includes an extended input/output data in bus intercoupling said modular microprocessor means with said input/output interface modules to transfer input data from said input/output interface modules to said modular microprocessor means.

9. An expandable modular control system in accordance with claim 1 wherein said memory devices each comprise a flip-flop.

10. In an electronic data processing system having microprocessor means for processing data in accordance with instructions arranged as a control program and as several subroutines said microprocessor means including a microprocessor device and input means coupled thereto for inputing gathered data and control data, the improvement comprising:

gated interrupt means for receiving and storing interrupts and for temporarily interrupting said microprocessor means in response to said microprocessor means receiving a gate interrupt control instruction after said gated interrupt means stores one of said interrupts to cause said microprocessor means to branch from said control program to one of said subroutines, said gated interrupt means includes: interrupt and data multiplexer means interposed between said input means and said microprocessor device for inputing an interrupt memory address corresponding to a particular one of said subroutines to said microprocessor device; and interrupt control means for applying an interrupt control signal to said microprocessor device to gate said interrupt memory address to said microprocessor device when said microprocessor means receives said gate interrupt control instruction.

11. The electronic data processing system in accordance with claim 10 wherein said modular microprocessor means generates an acknowledge interrupt (ACKI) signal concurrently with said gate interrupt control instruction being processed by said modular microprocessor means and including means for generating a system interrupt (SINT) signal whenever one of said stored interrupts is waiting to be processed by said modular microprocessor means and means for generating an unconditional interrupt (UNCI) signal whenever one of said interrupts is to be processed immediately without waiting for said ACKI signal to be generated, said interrupt control means including first gate means and second gate means, said first gate means having inputs with said SINT and ACKI signals being applied thereto, said first gate means having an output connected to a first input of said second gate means for enabling second gate means to cause an interrupt control output signal to be applied to said microprocessor device to gate said interrupt memory address thereto coincident with concurrent application of said ACKI and SINT signals to said first gate means, said second gate means having said UNCI signal applied to a second input to immediately gate said interrupt memory address to said microprocessor device.

12. The electronic data processing system in accordance with claim 11 wherein said modular microprocessor means includes means for generating a system synchronization signal to synchronize the functioning of said system and wherein said interrupt control means includes means comprising first and second flip-flops for synchronizing said interrupt control output signal with said system synchronization signal, said first and second flip-flops being coupled between the output of said second gate means and said interrupt control output, said second gate means setting said first flip-flop coincident with the application of said ACKI and SINT signals to said second gate means, said first flip-flop then setting said second flip-flop to generate said interrupt control output signal coincident with said system synchronization signal also being applied to said second flip-flop.

* * * * *